United States Patent [19]

Stone et al.

[11] Patent Number: 4,861,136

[45] Date of Patent: Aug. 29, 1989

[54] OPTICAL COMMUNICATION SYSTEMS USING FABRY-PEROT CAVITIES

[75] Inventors: Julian Stone, Rumson; Lawrence W. Stulz, Neptune, both of N.J.

[73] Assignees: American Telephone and Telegraph Company, New York, N.Y.; AT&T Bell Laboratories, Murray Hill, N.J.

[21] Appl. No.: 72,956

[22] Filed: Jul. 15, 1987

[51] Int. Cl.$^4$ .............................................. G02B 6/10
[52] U.S. Cl. ................................ 350/96.3; 350/96.15; 356/352
[58] Field of Search ................. 350/96.1, 96.15, 96.16, 350/96.28–96.30, 96.32; 372/6, 61, 62, 92, 97, 82; 356/352

[56] References Cited

U.S. PATENT DOCUMENTS

| | | | |
|---|---|---|---|
| 3,910,677 | 10/1975 | Becker et al. | 350/96.18 |
| 4,329,058 | 5/1982 | James et al. | 356/352 |
| 4,380,394 | 4/1983 | Stowe | 356/358 |
| 4,482,248 | 11/1984 | Papuchon et al. | 356/346 |
| 4,738,527 | 4/1988 | McBrien | 356/352 X |

OTHER PUBLICATIONS

Tuma et al.; "Control of Mirror Position in a High Precision Interferometer"; Journal of Physical E: Scientific Instruments, 1973, vol. 6, Feb. 1973; pp. 169–170.
Kohno et al.; "A Balloon-Borne Fabry-Perot Interference Spectrometer"; Optics Communications, vol. 17, No. 3, Jun. 1976; pp. 297–301.
BSTJ, vol. 56, No. 5, May–Jun. 1977, "Loss Analysis of Single-Mode Fiber Splices", D. Marcuse, pp. 703–718.
IEEE J. Quantum Electronics, vol. QE-17, No. 11, Nov. 1981, "A Sensitive Fiber Optic Fabry-Perot Interferometer", S. J. Petuchowski et al., pp. 2168–2170.
Applied Optics, vol. 20, No. 23, Dec. 1, 1981, "Long Optical-Fiber Fabry-Perot Interferometers", D. L. Franzen et al., pp. 3991–3992.
Electronics Letters, vol. 21, No. 11, May 23, 1985, "Optical Fibre Fabry-Perot Interferometer with Finesse of 300", J. Stone, pp. 504–505.
Optics Letters, vol. 7, No. 7, Jul. 1982, "Characteristics of Fiber-Optic Magnetic-Field Sensors Employing Metallic Glasses", Koo et al, pp. 334–336.
Optics Letters, vol. 10, No. 11, Nov. 1985, "Monomode Fiber-Optic Strain Gauge with Simultaneous Phase- and Polarization-State Detection", Leilobady et al, pp. 576–578.
"Multi-Beam Interference", Principles of Optics, Pergamon Press, 1959, pp. 322–332, M. Born et al.
"Optical-Fibre Fabry-Perot Interferometer with Finesse of 300", Electronics Letters, vol. 21, No. 11, May 23, 1985, pp. 504–505, J. Stone.
"Coupling Efficiency of Front Surface and Multilayer Mirrors as Fiber-End Reflectors", Journal of Lightwave Technology, vol. LT-4, No. 4, Apr. 1986, pp. 377–381, D. Marcuse et al.
"Wave Guides and Resonant Cavities", Classical Electrodynamics, John Wiley & sons, Inc., NY, 1962, pp. 235–246, John David Jackson.
"Simple High-Performance Mechanical Splice for Single-Mode Fibers", Optical Fiber Communications, Feb. 11–13, 1985, p. 26, C. M. Miller et al.
"Fast Frequency-Tunable External-Cavity Laser", Electronics Letters, vol. 23, No. 3, Jan. 29, 1987, pp. 98–99, B. Glance et al.
"20 kHz Linewidth 1.5 $\mu$m InGaAsP External Cavity Laser with 55 nm Tuning Range", Electronics Letters, vol. 19, No. 3, Feb. 3, 1983, pp. 110–112, R. Wyatt et al.
"Frequency Control of Local Oscillators", Microwave Mixer, Radiation Laboratory, Series 16, McGraw-Hill, New York, 1948, pp. 342–343, R. V. Pound.
"Wavelength-Selective Filters for Single-Mode Fiber WDM Systems Using Fabry-Perot Interferometers", Applied Optics, vol. 26, No. 3, Feb. 1, 1987, pp. 430–436, Stephen R. Mallinson.

Primary Examiner—Frank Gonzalez
Assistant Examiner—John Ngo
Attorney, Agent, or Firm—Samuel H. Dworetsky

[57] ABSTRACT

This invention is a new type of Fabry-Perot cavity, and an optical communication system using such a cavity. The inventive Fabry-Perot cavity comprises both a waveguiding portion and a nonwaveguiding portion. In this manner, tunable cavities of desirable mid-range length, necessary to obtain required free spectral ranges, may be fabricated with minimal diffraction losses otherwise associated with cavities of such length. The cavity length may be varied using, for example, piezoelectric elements, and the various cavity elements may be aligned and connected, using fiber connector technology.

8 Claims, 2 Drawing Sheets

OPTICAL COMMUNICATION SYSTEMS USING FABRY-PEROT CAVITIES

BACKGROUND OF THE INVENTION

1. Field of the Invention

This invention involves Fabry-Perot cavities, and optical communication systems which include such cavities. In the inventive device part of the cavity comprises a waveguide.

2. Description of the Prior Art

The economic advantages, envisioned years ago, of transmitting information in the form of optical signals have now been realized in commercial systems. Accordingly, designs for future optical communication systems go beyond the simple transmission of information on an optical carrier, and include the processing of signals while still in optical form. Current optical transmission systems must convert the optical signal to an electronic one before processing can take place. Such processing involves standard electronic devices. In the next generation of optical communication systems the optical signal itself often will be processed without conversion to an electronic signal. Such optical processing will require optical devices which are analogous to the electronic devices used for processing electronic signals, e.g., amplifiers, modulators, filters, etc. This invention - a new type of Fabry Perot cavity - is such an optical device which can be used to process optical signals.

The Fabry-Perot cavity was invented in the late 19th century. Its operation is well understood and discussed in most of the classic texts. See, for example, Born & Wolf, *Principles of Optics,* MacMillan, 1959, pages 322–332. An exemplary Fabry-Perot comprises a region bounded by two plane, parallel mirrors. The structure, as an entity, transmits only certain wavelengths, for which the cavity is said to be in "resonance" - a condition obtained by appropriately adjusting the cavity parameters. At resonance the cavity transmits a series of equally spaced wavelengths. The spacing between wavelengths, called the "free spectral range" of the cavity (FSR), is a function of, among other parameters, the spacing between the mirrors.

The use of Fabry-Perot cavities to process optical signals, for example as filters, is well known. However, the application of such devices to the processing of optical signals in commercial communication systems has been hampered by, among other constraints, the lack of practical designs which had the proper characteristics, such as appropriate values of free spectral range. Nevertheless designs have been suggested that more closely meet the needs of a commercial system. For example, in *Electronics Letters,* Vol. 21, No. 11, pp. 504–505 (May 12, 1985), J. Stone discussed a Fabry-Perot design in which the cavity was an optical fiber waveguide with mirrored ends. The free spectral range of the resulting cavity is determined by the length of the fiber segment, and accordingly different free spectral ranges can be obtained by using fibers of different lengths. The cavity can be "tuned" over one free spectral range by changing the cavity optical length by one-half the wavelength value of the light entering the cavity. In this way the cavity can be "tuned" to resonate at, and therefore transmit, light of different wavelength values. To obtain such tuning, the cavity length can be changed by means of an exemplary piezoelectric element attached to the fiber, which, when activated, will stretch the fiber and increase the associated cavity optical length accordingly.

Among the advantages of this "fiber Fabry-Perot" is the fact that the fiber is a waveguide. This eliminates deleterious diffraction effects present in long Fabry-Perot cavities which are not waveguides. The elimination of the deleterious diffraction effects is associated with the guiding characteristics of the fiber. However, the difficulty of working with small lengths of optical fiber precludes large values of free spectral range when using fiber Fabry-Perots, and consequently limits the usefulness of the fiber Fabry-Perot design.

Large free spectral ranges can be obtained using "gap" Fabry-Perots in which the cavity is a small gap. However, because of diffraction losses longer gap cavities are less practical, and therefore the gap Fabry-Perot is not adequate for applications which require the smaller free spectral ranges otherwise associated with larger gaps. Other techniques are known to minimize diffraction losses in large gap cavities, such as the use of expanded beams. However, those techniques involve other limitations which the practitioner may desire to avoid.

It is clear that while fiber Fabry-Perots can be used where short free spectral ranges are required, and gap Fabry-Perots can be used where large free spectral range Fabry-Perots are required, there is no effective design to answer the need for mid-range Fabry-Perots.

BRIEF DESCRIPTION OF THE INVENTION

The invention is a Fabry-Perot cavity which comprises in part a waveguiding portion and in part a nonwaveguiding portion. In this manner, a cavity is constructed whose length would be too short to manipulate effectively if it were comprised exclusively of a waveguiding portion, and whose length might have unacceptable diffraction losses if it were comprised exclusively of a nonwaveguiding portion. In the inventive device the resonant wavelength can be adjusted by varying the length of either the gap or the waveguide or both. The device can be advantageously constructed and aligned using fiber coupling technology.

DETAILED DESCRIPTION

The invention Fabry-Perot cavity addresses specific needs of advanced optical communications systems. In such advanced systems, the optical signal will often be processed while in optical form, without transforming it to electronic form. Among the devices needed for such processing of signals in optical form are optical filters, optical demodulators, etc.

An appropriately adjusted Fabry-Perot cavity could operate to process such signals. however, new embodiments are needed which would satisfy the design requirements for such devices. So, for example, without further engineering developments the free spectral range necessary for certain applications requires cavities of a length which are too short for realization in purely fiber form and too long for realization in purely gap form.

Figure 1:
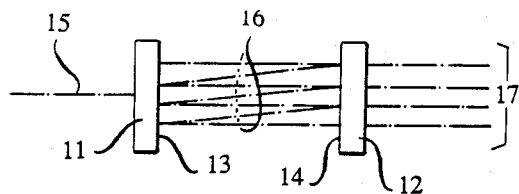
FIG. 1 is a schematic representation of a prior art Fabry-Perot cavity.
Figure 2:
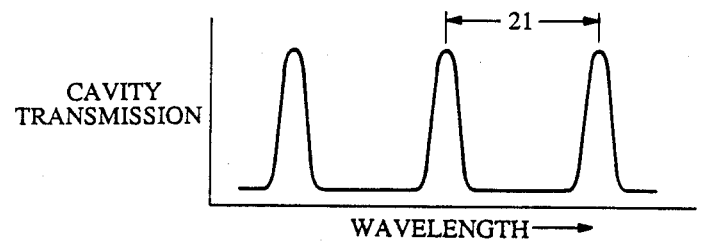
FIG. 2 is a schematic representation of the transmission characteristics of an exemplary Fabry-Perot cavity.

The resonant characteristics of a Fabry-perot cavity, which must be understood to appreciate the present invention, are more easily described in the context of FIGS. 1 and 2. (For the purpose of the discussion the term optical, as used in "optical wavelength" or "optical communications systems" refers to electromagnetic radiation of wavelength value of such that the radiation can be transmitted by means of dielectric fibers with loss less than 25 db/Km. Such wavelengths are currently in the range of from 4000 Å to 20,000 Å. However, as new fiber materials and designs are developed the "optical" range can expand further into the infrared and ultraviolet. In any event, the "optical" range as used here does not necessarily coincide with the "visible" portion of the spectrum.)

In FIGS. 1, 11 and 12 are exemplary plane, parallel materials which transmit optical wavelengths. The inner surfaces of 11 and 12, identified as 13 and 14, at least partially reflect optical wavelengths. Light 15 entering the cavity defined by the mirrors partially reflects back and forth between the two mirrors 13 and 14. This is shown schematically in the Figure by the rays 16. The transmitted beam 17 may be viewed as consisting of various rays, each associated with a different reflection at the mirror 14. These transmitted rays interfere with each other, either constructively or destructively depending upon the phase of the various rays at the mirror surface.

When the spacing between the mirrors, and the other cavity parameters, are adjusted so that the transmitted light rays interfere constructively, the cavity is said to be in "resonance", and light of appropriate wavelength is transmitted as shown by 17. For such wavelengths the cavity acts as a filter, as shown in FIG. 2.

The distance between cavity transmission wavelengths, shown in FIG. 2 as 21, is called the "free spectral range" (FSR) of the cavity and is given in frequency units by $$\text{Free spectral range } (FSR) = \frac{C}{2nL_c} \quad (1)$$

Here, C is the speed of light, n is the index of refraction of the medium within the cavity, and $L_c$ is the length of the cavity, i.e., the distance between the two mirrors. Although FIG. 2 shows an apparent absence of transmission in the region between the transmission peaks, there is in fact some non-zero transmission in those regions for real Fabry-Perots. Such non-zero transmission between the transmission peaks of the Fabry-Perots will result in "cross-talk" when the devices are used in wavelength multiplexed optical communication systems. In such systems, numerous "channels" of different wavelengths are transmitted, one for each subscriber line. The lack of discrimination, associated with the non-zero transmission between the resonant peaks, results in the deleterious cross-talk and is a limitation that must be considered in system development. See for example, Marcuse and Stone, *Journal of Lightwave Technology*, Vol. LT-4, No. 4, April 1986, pp. 377 et seq.

The bandwidth of the transmission peaks shown in FIG. 2, i.e., the width of the transmission peak at half maximum, is a function of the reflectivity of the mirrors and is given by $$\text{Bandwidth} = \frac{FSR}{f} \quad (2)$$

where f is the finesse of the cavity, given by $$f = \pi \frac{\sqrt{R}}{1 - R} \quad (3)$$

where R is the reflectivity of the mirrored surfaces. It should be noted that the simple finesse discussed here represents only those contributions due to the inherent characteristics of the mirrors themselves. A more complete analysis shows that in addition to this "mirror" finesse there are contributions due to, for example, diffraction effects, alignment effects, and surface effects. All of these contributions, which represent actual loss mechanisms, result in lowered finesse and lowered throughput. See, for example, Marcuse and Stone, op. cit. These contributions would therefore have to be considered in specific design development.

Design difficulties associated with diffraction losses, as well as practical limitations associated with the use of macroscopic mirrors such as those shown in FIG. 1, may be alleviated through the use of a design discussed, for example, by J. Stone in *Electronics Letters*, Vol. 21, No. 11, pp. 504–505, published on May 23, 1985. In that publication, Stone shows that the Fabry-Perot cavity can be an optical fiber with mirrored fiber ends. Since the fiber is a waveguide, and "confines" light of appropriate modal content entering the waveguide, diffraction effects are eliminated. The free spectral range of the cavity can be selected, depending upon the contemplated system applications, by choosing a fiber of appropriate length. The resonant characteristics of the cavity can be tuned over a free spectral range by "stretching" the fiber length using, for example, an attached piezoelectric element.

Design criteria for bandwidth and finesse may be understood by considering that in wavelength multiplexed systems, especially for those to be used in local area networks, a desired bandwidth ranges from several hundred megahertz to the gigahertz range, with a capacity to transmit hundreds of channels. Allowing for a factor of five spacing between the various channels dictates a working free spectral range of approximately one hundred gigahertz. This mandates cavities of length in the millimeter range. A system with higher finesse will minimize the amount of transmission which occurs between transmission peaks, and therefore minimizes cross-talk. However, lower finesse will limit insertion loss.

It is clear from Equation 1 that if large free spectral ranges are needed, short length cavities must be used. However, from a simple physical design viewpoint, it is extremely difficult to "stretch" small lengths of fiber, and therefore such short cavities, if they are fiber cavities, cannot be effectively "tuned". This tuning difficulty is due not only to difficulties associated with the physical size of such a short length of fiber, but is also associated with the difficulty of obtaining, for example, a short piece of piezoelectric material whose length can be varied by as much as one-half an optical wavelength. Such a material, appropriately connected to the fiber, is necessary in certain embodiments to obtain the required tuning. Consequently, for applications in which short Fabry-Perots are necessary, "gap" cavities such as that shown in FIG. 1 may be used. There is, however, a mid-range of applications, involving cavities on the order of 5 mm long, for which a gap cavity could involve unacceptably high diffraction losses, but for which a fiber cavity would still be too short to be easily tunable.

Figure 3:
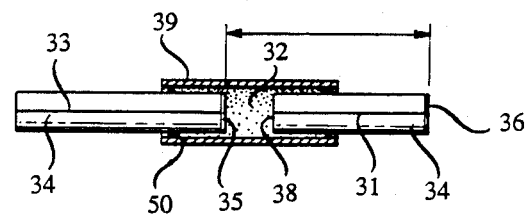
FIGS. 3 and 4 are schematic representations of the inventive Fabry-Perot cavity.
Figure 4:
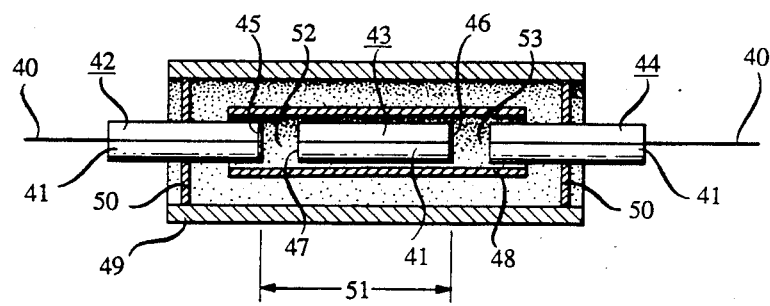

FIGS. 3 and 4 are embodiments of the invention which solves the need for such mid-range cavities. In the simple schematic embodiment of FIG. 3, a fiber "waveguide" 31 and a gap 32 are combined to form a Fabry-Perot cavity bounded by surfaces 35 and 36. The defining characteristics of a waveguide are well known in the field and are described in all of the classical texts. See, for example, John David Jackson, *Classical Electrodynamics*, John Wiley & Sons, Inc. New York - London, 1962, pages 235–246. To properly define the characteristics of a waveguide, one must analyze the appropriate solutions to Maxwell's equations. However, in general, a waveguide is a structure in which the field configurations will not change in at least one dimension. Accordingly, in the embodiment of FIGS. 3 and 4, the field configurations descriptive of the waveguide modes are constant along the longitudinal direction of symmetry.

The reflective surfaces, characteristic of Fabry-Perots, are represented in FIG. 3 by 35 and 36. Accordingly, an exemplary cavity length of from 1 to 10 mm or 2 to 7 mm is given by 37. The surface 38 will preferably include an antireflective coating so as to uniquely define the cavity limits at the reflecting surfaces 35 and 36. Without the antireflection coating, reflection that may occur at surface 38 will result in a second weaker Fabry-Perot defined by the bounding surfaces 36 and 38, thereby resulting in a cavity within a cavity, reducing the effectiveness of either of the cavities. However, the use of the antireflecting coating on 38 permits the clear definition of a single cavity bounded by the surfaces 35 and 36. Such an antireflective coating may be used similarly in the device shown in FIG. 4 at surface 47.

In FIG. 3, the element 39 is a schematic representation of means for varying the optical length of the cavity in order to vary its resonant characteristics, and therefore the value of the wavelengths which are transmitted by the cavity. The optical length of the cavity is defined as the product of the index of refraction and the physical length of the cavity, and accordingly the optical length may be varied by either altering the physical length of the cavity or by altering the dielectric characteristics of the medium within the cavity. Clearly, combinations of both may also be used. Specific embodiments of element 39 may include piezoelectric elements, thermal elements, or other appropriate elements, which alter the optical length of either the gap or the waveguide or both by changing either the index of refraction of the medium or the physical length of the medium or both. The element 39 may be attached to the fibers 31 and 33, as shown in FIG. 3, by enclosing the fibers in, for example, ferrules 34 borrowed from the fiber connector technology and attaching the element 39 to the ferrule 34 by means of an appropriate adhesive 50. Although the embodiment of FIG. 3 shows element 36 as a cylindrical shell, it is clear that the element need not have that specific physical configuration and may be configured in any way that permits effective practice of the invention. Likewise, in FIG. 4 the similar element 49 need not be cylindrical in shape. In broader context, the shapes of any of the elements shown in the specific embodiments of the Figures may be varied in a manner consistent with effective practice of the invention.

One aspect of the invention which is illustrated in FIG. 3 should be carefully noted. That aspect involves the relative lengths of element 39, used to vary the cavity length, and the length of the cavity 37 itself. It should be noted that in prior art cavities the size of element 39, especially when parallel to the axis of symmetry of the cavity, was no larger than the cavity itself. For smaller cavities this is a critical limitation since the change in length which can be effected by element 39 is only a fraction of the length of element 39. However, if the cavity is small and the element 39 is equal to the size of the cavity, then the amount of change that can be effected by the element 39 will be relatively small. But, the change that must be effected in the cavity length is one-half the wavelength of the light entering the cavity - an absolute number independent of the cavity length. If the cavity is small, and the element 39 is likewise small, then the amount of change that can be effected by the element 39 may be less than the necessary half wavelength. New structures which permit relatively large changes in dimensions of element 39 may permit effective use of such elements even though they are as short as the cavity length. However, this problem may also be solved, as shown in FIG. 3, by using an element 39 which is longer than the cavity itself.

In practical embodiments of the invention alignment of the various cavity elements becomes critical. Poor alignment results in the very least in decreased values of finesse and increased insertion loss. Additionally, connection of the cavity to other elements of the optical system must also be considered. Applicant has solved these problems by using fiber connector technology. A critical characteristic of such connectors is their ability to establish and maintain alignment to very high tolerances. Accordingly, in FIG. 4, the inventive cavity is shown using appropriate fiber connectors to align the cavity elements, and to connect the cavity to other fiber elements of the optical communication system.

In FIG. 4, 40 is an optical fiber, which in this exemplary embodiment may be part of a larger optical communication system. The fiber 40 is connected to the embodiment of the invention which is shown in the Figure. In the embodiment the cavity comprises region 51, which is bounded by reflecting surfaces 45 and 46. As shown in the Figure the cavity comprises, in part, a waveguide 43, and, in part, a nonwaveguiding gap 52.

In order to properly align the fiber and cavity elements the fiber is enclosed in appropriate glass or ceramic ferrules 41 borrowed, for example, from fiber connector technology. These ferrules provide a surface for connection of the piezoelectric element, but, more importantly, provide a simple means for aligning the various elements of the system including 43, 43 and 44. Additionally, the ferrules 41 may provide a means for connecting the cavity to the remainder of the optical communication system, using the established fiber connector technology.

Small changes in the size of the cavity may be effected by means of the exemplary piezoelectric element 49, which is attached to the fiber, using the exemplary ferrules 41 and epoxy adhesives 50. The center and right hand fiber elements 43 and 44, may be placed in the sleeve rigidly with little opportunity for motion, while the left hand element may be placed with greater opportunity for motion so that activation of the piezoelectric device results in an increase in the size of the gap 52 and therefore an increase in the optical length of the cavity. The gap 53 is not part of the optical cavity and may be set to optimize operation. It should be noted that in accordance with an aspect of this invention, the piezoelectric element is longer in extent than the cavity itself.

The inventive cavity can be made using standard production single mode fiber. If multimode fiber is used, the cavity will have resonances associated with each of the modes that can be supported by the fiber, thereby destroying selective transmission characteristics of the Fabry-Perot cavity. Fiber ends may be prepared by epoxying the fiber in precision-bore, snug-fitting capillary tubes used in rotary splice connectors, see C. M. Miller et al, *Optical Fiber Communications*, Feb. 11–13, 1985, page 26. In these tubes the bore axis is extremely well aligned with the outer surface of the tube. The tubes are placed in a well-aligned chuck and the ends are polished. Mirrors are then deposited on the ends using, for example, E-beam evaporating system. Eight alternating ¼ wavelength layers of Si and $SiO_2$ may be deposited. The measured transmission of a similarly-coated microscope slide is 1.5–2%. A piezoelectric rod, 49, is epoxied onto the tubes to provide the tuning. Rotary splice connections may be made to the fiber FabryPerot tubes. The splice connection may be made from tubes matched to those on the fiber ends so that low coupling loss could be obtained by butting the tubes together with a predetermined orientation. An exemplary length for element 43, is 4.00 mm. The gap 52, as shown in FIG. 4, is approximately 2 microns long and accordingly the total cavity length is approximately 4.00 mm, resulting in a tuning range $\Delta f$ of 25.00 GHz.

Figure 5:
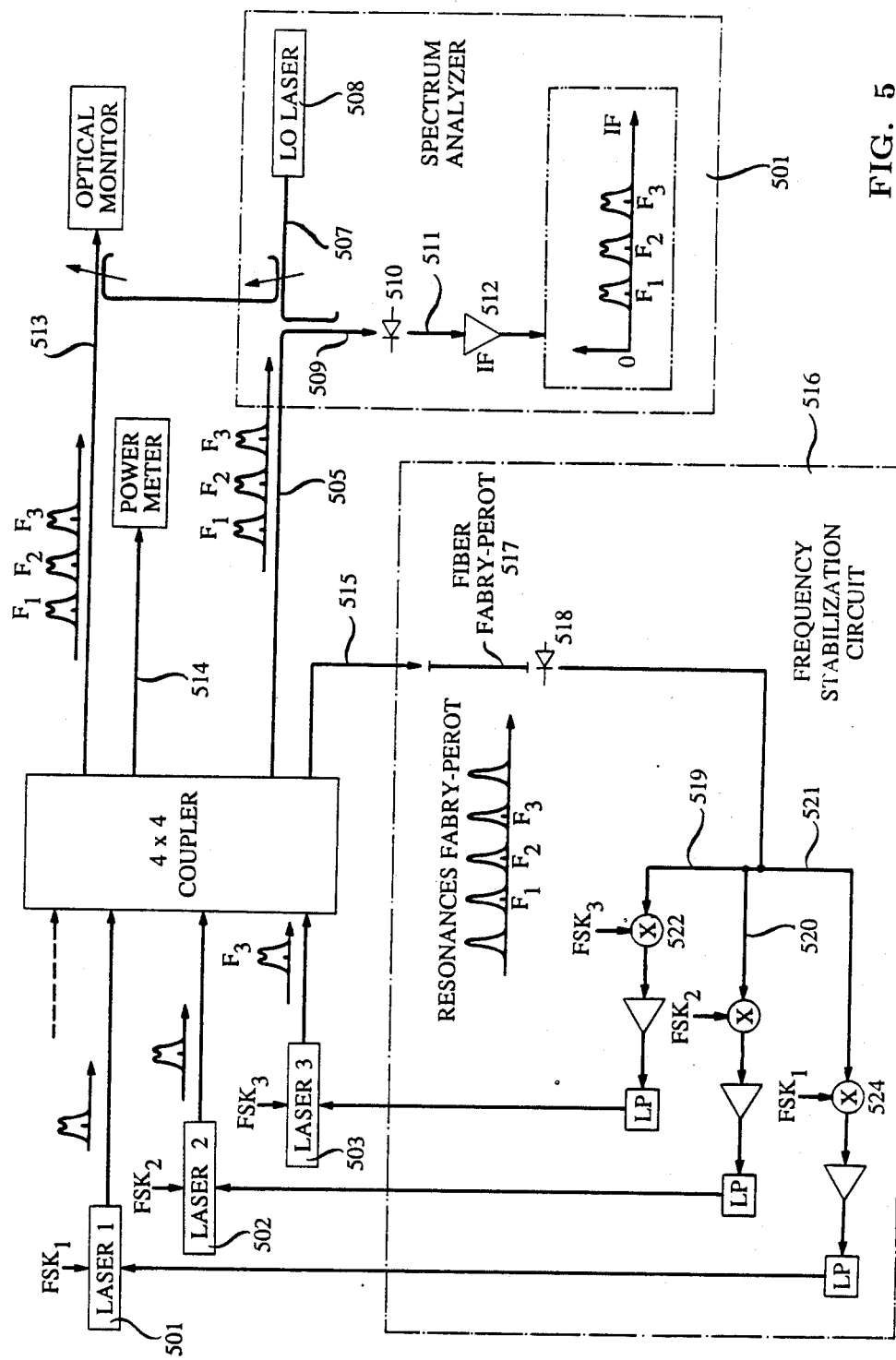
FIG. 5 is a schematic representation of an exemplary optical communications system, using the inventive Fabry-Perot cavity.

FIG. 5 is a specific embodiment of the invention used as part of an optical communication system. This embodiment is similar to the disclosure of Bernard Glance, filed in the U.S. Patent and Trademark Office on June 9, 1987, Ser. No. 059,973, with the critical distinction that the inventive fiber Fabry-Perot disclosed in this application is used.

The embodiment of FIG. 5 involves the stabilization of a comb of intelligence bearing frequency multiplexed signal frequencies, using the resonances of the inventive Fabry-Perot cavity. The multiplexed signal will have been modulated at a frequency which may be representative of intelligence and which is referred to a "dithering" frequency. The stabilization is effected through the use of at least two appropriate feedback loops. Separate error signals associated with the drifts of at least two signals which have been multiplexed and transmitted through the inventive Fabry-Perot are independently generated by mixing the dithering component of the multiplexed signals with a corresponding dithering frequencies. An optical network using frequency division multiplexing (FDM) and heterodyne detection techniques can provide the capability of interconnecting a very large number of subscribers. However, such a system requires that the frequency interval between the optical carriers can be controlled in order to avoid collision between the optical signals. In a radio system, this problem is solved by assigning a fixed frequency to each carrier controlled by a high stabile frequency source. Such an approach will be very difficult and expensive to implement in an optical FDM communication system, especially if the frequencies of the optical sources must be spaced at small frequency intervals.

The inventive fiber Fabry-Perot resonator, when tunable, may be used at each subscriber location providing a comb of equally-spaced resonances from which the subscriber selects one resonance to frequency-lock his optical source. The set of resonances is made the same for all the subscribers by frequency-locking all the Fabry-Perot resonators to an optical signal received from a central location. In the following a variant of this scheme is discussed in which all the optical sources are frequency-locked to the resonances of a single Fabry-Perot resonator. This frequency stabilization scheme provides a simple solution to the frequency confining problem of FDM optical signals originating from the same location. The optical portion of the implementation may use the inventive Fabry-Perot resonator, and a photodetector. The remaining signal processing may be done electronically.

1. Circuit Description

An exemplary circuit for the practice of this embodiment of the invention is shown in FIG. 5. The three optical sources, 501, 502 and 503, are fast frequency-tunable external cavity lasers providing a single-frequency signal around 1.28 $\mu m$ that can be frequency-tuned over several thousands of GHz as well as frequency-modulated up to 100 Mb/s. See, for example, B. Glance et al, *Electronics Letters*, Vol. 23, No. 3, pp. 98–99, January 1987. The optical sources are tuned to different frequencies, spaced by a frequency interval that can be varied from zero MHz to several tens of GHz. As shown in the figure, each laser is Frequency Shift Keyed (FSK) at 45 Mb/s by an independent random NRZ bit stream. The modulation index is equal to about one. The three optical signals are multiplexed by a 4×4 optical coupler, 504. Each of the 4 output fibers of the coupler carries the three FDM signals. For analysis, the multiplexed signal from one of the fibers 505 may be transposed from the optical domain to the IF domain at 506. The multiplexed signal on 502 is combined at 509 with the optical signal 507 from a tunable external-cavity laser 508. See, for example, R. Wyatt et al, *Electronics Letters*, Vol. 19, No. 3, pp. 110–112, February 1983. The resulting signal is detected by a photodiode 510 yielding an IF signal 511 which can be observed with an IF spectrum analyzer 512. Two other output fibers 513 and 515 are used, respectively, to monitor the optical signals and to measure the signal power. The fourth output fiber 515 is connected to the frequency stabilization circuit, 516.

The inventive Fabry-Perot resonator is designed to provide a comb of resonances equally-spaced by 500 MHz with a 3 dB bandwidth of about 50 MHz. One end of the regular section of fiber is connected to one of the outputs 515 of the 4×4 optical coupler; the other end illuminates a photodetector 518.

The error signal needed to frequency-lock the optical sources is generated as follows: As an optical source drifts from the peak of a Fabry-Perot resonance, the photodiode detects a baseband signal having the same pattern as the FSK bit stream modulating the optical source. However, the polarity of the detected pattern relative to that used to FSK the laser depends on which side of the resonance the frequency drift occurred. Thus, an error signal can be obtained by multiplying the FSK bit stream by the detected signal and filtering the resulting amplified product by a low-pass filter. See, for example, R. V. Pound, *Radiation Laboratory Series* 16 pp. 342–343, McGraw-Hill, New York, 1948. The error signal is the used to lock the laser frequency to the selected Fabry-Perot resonance.

In the present case, three independent error signals are obtained from the same photodiode current. This is achieved by dividing the photodiode signal into three parts 519, 520 and 521, each feeding a balanced-mixer 522, 523 and 524, respectively. The second input of this device is fed by one of the three different FSK modulating signals as shown ($FSK_1$, $FSK_2$ and $FSK_3$). Therefore, each balanced mixer acts as a correlator, comparing a given FSK modulating signal to the presence of a similar pattern detected by the photodiode. As a result, each balanced mixer yields an error signal depending only on the frequency drift of one laster. The three lasers can thus be frequency-locked, independently, to any of the resonances of the Fabry-Perot resonator.

The above frequency stabilization circuit can be generalized an FDM system having a large number of optical sources, all of which are frequency-stabilized to the resonances of a single Fabry-Perot resonator.

What is claimed is:

1. An optical communication system comprising:
   (a) means for wavelength multiplexing at least two optical signals
   (b) means for transmitting the multiplexed signals to a receiver, the receiver comprising a Fabry-Perot cavity bounded by reflecting surfaces the invention characterized in that
   the cavity region includes a waveguiding portion and a non-waveguiding portion.

2. The system of claim 1 further including means for varying the optical length of the cavity.

3. The system of claim 2 wherein the means for varying the optical lenth of the cavity comprise means for varying the physical length of the cavity.

4. The system of claim 3 wherein the means for varying the physical length of the cavity comprise a piezoelectric cavity.

5. The system of claim 2 wherein the means for varying the optical length of the cavity comprise means for varying the dielectric properties of the cavity medium.

6. The system of claim 1 further comprising fiber connecting means to align waveguiding portions of the cavity.

7. The system of claim 2 wherein the cavity length is between 1 and 10 millimeters.

8. The system of claim 7 wherein the cavity lengths is between 2 and 7 millimeters.

* * * * *